Dec. 8, 1942.  A. C. SCHROEDER  2,304,603
CONVEYING ELEMENT
Filed Feb. 13, 1941
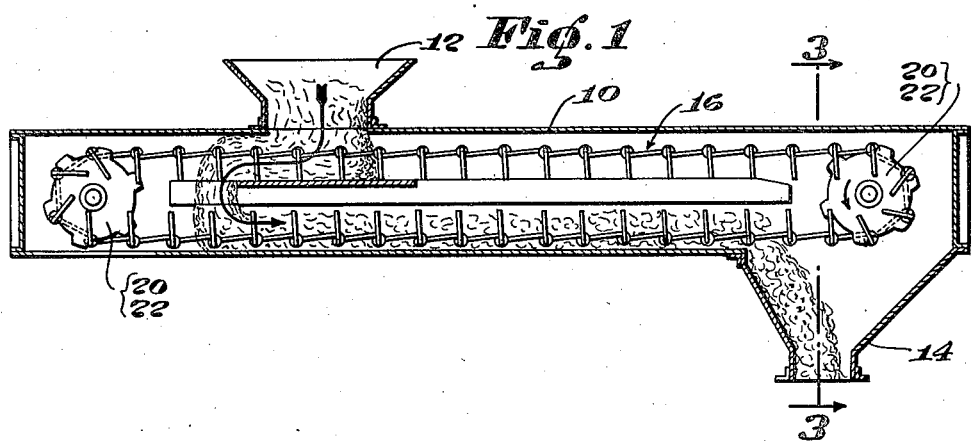
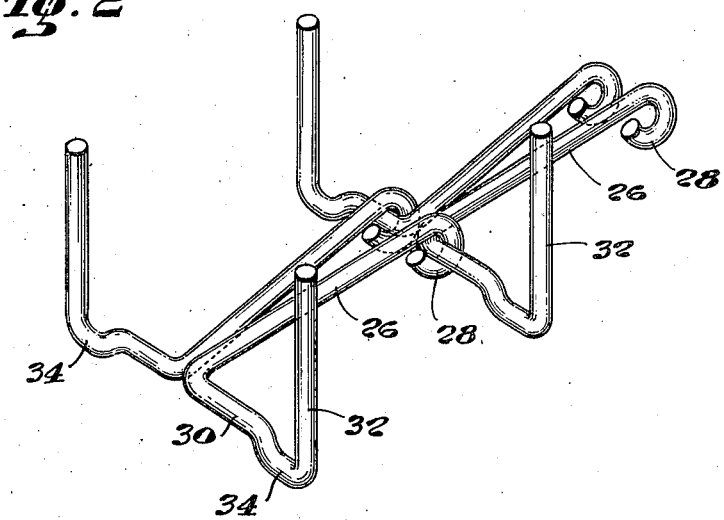
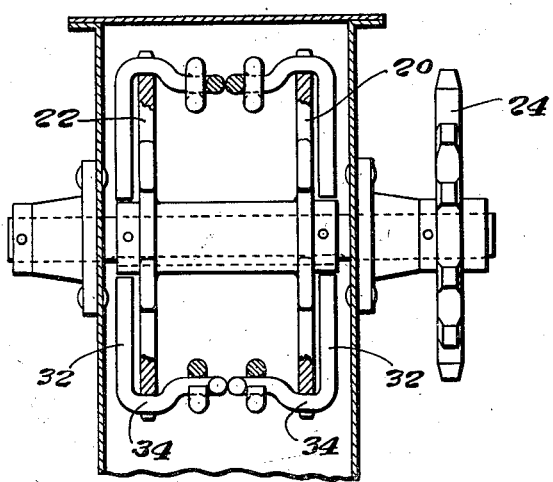
INVENTOR
Arthur C. Schroeder
BY J. Stanley Churchill
ATTORNEY Patented Dec. 8, 1942

2,304,603

UNITED STATES PATENT OFFICE 2,304,603

CONVEYING ELEMENT

Arthur C. Schroeder, Syracuse, N. Y., assignor to Redler Conveyor Company, Quincy, Mass., a corporation of Massachusetts Application February 13, 1941, Serial No. 378,731

9 Claims. (Cl. 198—168)

This invention relates to a conveying element.

The invention has for an object to provide a novel and highly efficient construction of conveying element made up of a plurality of individual flights each comprising two component members adapted for manufacture by die forging operations in a simple and economical manner and which cooperate when connected to other similar flight members to form a conveying element of the open flight type, adapted for operation in accordance with the principles set forth in the Redler Reissue Patent No. 18,445.

With this object in view and such others as may hereinafter appear, the invention consists in the conveying element and in the various structures, arrangements and combinations of parts hereinafter described and particularly defined in the claims at the end of this specification.

In the drawing illustrating the preferred embodiment of the invention, Fig. 1 is a longitudinal sectional view of a conveyer embodying the present conveying element; Fig. 2 is a perspective view of a portion of a conveying element embodying the invention; and Fig. 3 is a cross-section on the line 3—3 of Fig. 1.

In general, the invention seeks to provide a novel structure of conveying element which is adapted for use in a conveyer of the type illustrated in the Redler reissue patent above referred to. The improved conveying element comprises two contiguous endless articulate component members each provided with a series of longitudinally spaced flight members extending transversely thereof and the corresponding flight members of said endless component members cooperate to form in effect a series of longitudinally spaced open flights whereby to enable the conveying element, when drawn through a casing or trough, to convey the material therethrough in a continuous stream. In practice and in the preferred form of the invention, each endless component member is made up of a plurality of units each formed from a length of bar stock die forged into the desired shape and adapted for pivotal connection to adjacent units. Each unit may be provided with a longitudinally extended portion comprising a tension member having a loop formed at one end and having its other end bent to extend transversely and then upwardly to form a half flight. The loop of one tension member is designed to be slipped over the upstanding end of the next adjacent half flight and disposed upon the transversely extended portion thereof. The half flights of one component member are extended transversely in one direction while the corresponding half flights of the other component member are extended transversely in the opposite direction so that when the two component members are drawn through the casing or trough in contiguous relation the half flight sections cooperate to form in effect a series of open flights. The component members are arranged to be drawn through the casing by duplicate sprockets and the structure has the inherent advantage that it may be readily assembled and the parts thereof replaced with minimum effort and in a minimum time.

Referring now to the drawing, 10 represents a casing of a conveyer of the "Redler" type above referred to having an inlet 12 and an outlet 14. The conveying element indicated generally by the numeral 16, comprises two component members arranged to be drawn over duplicate sets of sprockets 20, 22 mounted at the opposite ends of the conveyer casing, as shown, and one set of which is arranged to be driven from a source of power through a driving sprocket 24. The two component members comprising the conveyer flight may and preferably will be independent of one another and each formed of a series of units detachably and pivotally connected together. Each unit of one component member may comprise a longitudinally extended portion 26 forming a tension member provided with a loop 28 at one end and having its other end bent to form a transversely extended portion 30 and an upright member 32. The transversely extended portion 30 may and preferably will be provided with a depressed portion 34 with which the teeth of the sprockets 20, 22 cooperate in order to draw the component members through the casing 10. The portions 30 of the individual flight units making up one component member will be extended transversely in one direction while the corresponding portions 30 of the flight sections making up the second component member will be extended in the opposite direction so that when both component members are drawn through the casing in contiguous relation, the two portions 30 and two upright portions 32 of the corresponding flight sections cooperate to form in effect a U-shaped flight capable of effecting the conveyance of material through the casing in a continuous stream in accordance with the principles of the Redler reissue patent above referred to.

In assembling the individual flight members of each component member the loop 28 is passed downwardly over the upright member 32 of the next adjacent section onto the transversely extended portion thereof. When it is desired to replace the individual flight members, the loop portions 28 may be slipped over the transversely extended portion 30 and upwardly over the upright 32 to remove the flight from the component member of the conveying element. By reference to Fig. 2 it will be observed that these operations may be accomplished in a minimum time and with minimum effort.

It will also be apparent from Fig. 2 that the tension members 26 of the pair of complemental units which cooperate to form a substantially U-shaped flight are arranged at an angle with respect to each other and that the laterally extending portions 30 are arranged relative to their respective tension members on an angle less than a right angle.

The endless component members of the conveyor 16 are arranged in the casing 10 so that the ends of the tension members 26 remote from the loops 28 are preferably in contiguous relation or contact, as indicated by Fig. 3. The loops 28 encircle the lateral flight portions 30 and are disposed inwardly of the downwardly offset portions 34 which engage with the sprockets 20 and 22. Thus, it is apparent that the outer portions of the loops 28 lie in a horizontal plane substantially common to the outer surfaces of the offset portions 34 and that any undesirable outward movement of the loops 28 along the lateral portions 30 is prevented by the offset portions 34. In view of this fact, and the further fact that when the conveyor is in use and under tension the inertia of the material in the conduit is effective against the lateral portions 30 and upright members 32 of the individual conveyor units tending to maintain the portions of the tension members 26 remote from the loops 28 in contiguous relation, there is no objectionable tendency for the loops of the units of the respective conveyor units to shift laterally outwardly along the portions 30. Thus, it is unnecessary to provide any specific means to retain the loops 28 on the laterally extending portions 30 to maintain the units of the component conveyor members assembled.

The present structure of conveying element lends itself particularly to manufacture from bar stock by die forging operations and as a result of this procedure, it is possible to use standard bar stock of any required material, such for example, as steel, stainless steel, brass, bronze, phosphor bronze, Monel metal and any of the other corrosion resisting and durable alloys now upon the market. The conveying element produced possesses superior strength characteristics as compared to corresponding cast iron or cast steel links of prior conveyers and in addition, the die forging operation enables the conveying element to be produced at minimum expense. The bar stock lends itself to heat treatment by which the durability of the conveying element may be increased.

While the preferred embodiment of the invention has been herein illustrated and described, it will be understood that the invention may be embodied in other forms within the scope of the following claims.

Having thus described the invention, what is claimed is:

1. In a conveyer, an endless conveying element adapted to be drawn through a casing comprising two endless articulate component members each having longitudinally spaced half flight members, the corresponding half flight members of said component members cooperating when the latter are drawn through the casing in contiguous relation to form in effect a series of connected longitudinally spaced substantially U-shaped open flights for conveying material through the casing in a continuous stream.

2. In a conveyer, an endless conveying element adapted to be drawn through a casing comprising two endless articulate component members each formed of a series of pivotally and detachably connected units, each unit being provided with a flight member and a rigid tension member connecting it to the flight member of an adjacent unit, the corresponding flight members of said component members cooperating when the latter are drawn through the casing in contiguous relation to form in effect a series of connected longitudinally spaced open flights for conveying material through the casing in a continuous stream.

3. In a conveyer, an endless conveying element adapted to be drawn through a casing comprising two endless articulate component members each being formed of a series of connected units, each unit being formed from a length of bar stock formed into a shape at one end to provide a flight member and shaped at its opposite end to provide attaching means for connection to a succeeding unit, the corresponding flight members of said component members cooperating when the latter are drawn through the casing in contiguous relation to form in effect a series of connected longitudinally spaced open flights for conveying material through the casing in a continuous stream.

4. In a conveyer, an endless conveying element adapted to be drawn through a casing comprising two endless articulate component members each being formed of a series of pivotally and detachably connected units, each unit being formed of a length of bar stock formed into a shape to provide a flight member at one end thereof and a loop at the second end thereof adapted to be slipped over the flight of the next adjacent unit to detachably connect the units, the corresponding flights of said component members cooperating when the latter are drawn through the casing in contiguous relation to form in effect a series of connected longitudinally spaced open flights for conveying material through the casing in a continuous stream.

5. In a conveyor, an endless conveying element adapted to be drawn through a casing comprising two endless articulate component members each being formed of a series of pivotally and detachably connected units, each unit being formed of a length of bar stock formed into a shape to provide it with a longitudinally extended tension member having one end formed into a loop, and its second end extended transversely and upwardly to form half of a flight member, the flight members of one component member extending transversely in one direction and the corresponding flight members of the second component member extending transversely in the opposite direction, the corresponding half flight members cooperating when the component members are drawn through the casing in contiguous relation to form, in effect, a series of connected longitudinally open flights for conveying the material through the casing in a continuous stream.

6. A conveyor flight unit comprising, a longitudinally extending portion forming a generally horizontal tension member, said tension member being provided with a loop at one end thereof and a flight portion projecting laterally from the opposite end thereof and terminating in an upright member.

7. A conveyor flight unit as defined in claim 6, in which the laterally projecting flight portion includes an offset portion spaced from the adjacent end of the tension member.

8. A conveyor flight comprising two units adapted to be arranged in contiguous relation, each of said units having a longitudinally extending portion forming a generally horizontal tension member, said tension member being provided with a loop at one end thereof and having a flight portion projecting laterally from the opposite end thereof and terminating in an upright member, the laterally projecting flight portions of the two units extending in opposite directions so that they cooperate to form a substantially U-shaped open flight.

9. A conveyor comprising a series of connected flight units, each of said flight units having a longitudinally extending portion forming a generally horizontal tension member, said tension member being provided with a loop at one end thereof and having a portion projecting laterally from the opposite end thereof and terminating in an upright member, the loop of one flight unit being adapted to be slipped downwardly over the upright member of an adjacent flight unit and along said laterally projecting portion to a position adjacent the tension member of said adjacent unit to thus assemble said units.

ARTHUR C. SCHROEDER.